United States Patent
Boutenko et al.

(10) Patent No.: US 6,175,613 B1
(45) Date of Patent: Jan. 16, 2001

(54) METHOD FOR PROCESSING A SEQUENCE OF RADIOLOGICAL IMAGES OF AN OBJECT

(75) Inventors: Vladislav Boutenko, Puteaux; Rémy Andre Klausz, Neuilly-sur-Seine; Régis Vaillant, Villebon/Yvette, all of (FR)

(73) Assignee: GE Medical Systems S.A. (FR)

( * ) Notice: Under 35 U.S.C. 154(b), the term of this patent shall be extended for 0 days.

(21) Appl. No.: 09/114,263

(22) Filed: Jul. 11, 1998

(30) Foreign Application Priority Data

Jul. 11, 1997 (FR) .................................................. 97 08887

(51) Int. Cl.[7] .................................................. H05G 1/64
(52) U.S. Cl. .......................................... 378/98.4; 378/98.2
(58) Field of Search .................................. 378/98.4, 98.2

(56) References Cited

U.S. PATENT DOCUMENTS

| | | | |
|---|---|---|---|
| 4,081,681 | * 3/1978 | Froggatt | 250/360 |
| 4,644,575 | * 2/1987 | Kruger et al. | 378/99 |
| 4,823,370 | * 4/1989 | Kikuchi | 378/99 |
| 5,270,925 | * 12/1993 | Stegehuis | 364/413.17 |

FOREIGN PATENT DOCUMENTS

| | | | |
|---|---|---|---|
| 19505283 | * | 4/1996 | (DE) . |
| 0105618 | * | 4/1984 | (EP) . |
| 0766205 | * | 4/1997 | (EP) . |
| 2653961 | * | 5/1991 | (FR) . |

* cited by examiner

Primary Examiner—Craig E. Church
(74) Attorney, Agent, or Firm—Jay L. Chaskin

(57) ABSTRACT

The unsharpness of a radiological image is estimated by four independent passes which recursively implement the same exponential function, and the unsharpness ($Id_{k-1}$) estimated for the previous image ($IM_{k-1}$) is subtracted from the current image ($IM_k$).

5 Claims, 2 Drawing Sheets

METHOD FOR PROCESSING A SEQUENCE OF RADIOLOGICAL IMAGES OF AN OBJECT

Figure 1:
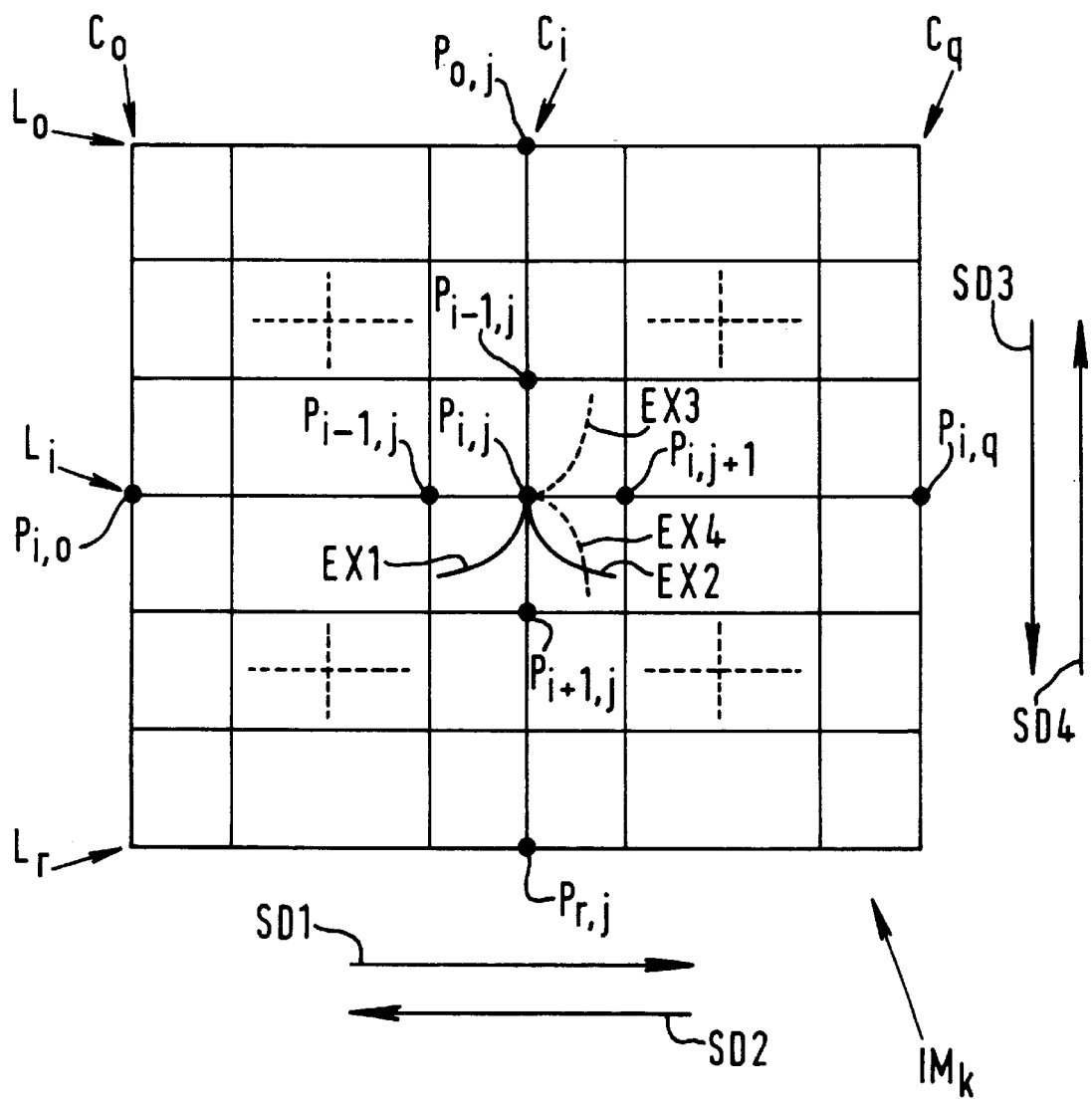

The invention relates to the processing of a sequence of radiological images of an object.

After an object, for example a part of a patient's body, has been illuminated with X-radiation, a radiological image of the object is obtained. In practice, for the purpose of obtaining the corresponding radiological image, the illumination of the object gives rise to direct radiation and radiation which is Scattered by the object itself. However, this scattered radiation leads to the addition of unsharpness on the radiological image which is obtained, and this makes it more difficult to pick out elements of interest on the acquired radiological image, for example specific parts of the human body which are intended to be examined.

In general, in the processing of a sequence of radiological images of an object, after having acquired the raw image its scattered radiation or "unsharpness" is estimated and at least partially subtracted from the total image.

Several solutions have to date been proposed for estimating the scattered radiation of a radiological image.

One solution may consist in measuring the scattered radiation at various locations of the image while masking the primary radiation, for example with one or more discs, and by then interpolating this measurement over the total image. One drawback of this solution resides in the loss of a useful fraction of the information due to the presence of "holes" in the image, these holes being caused by the masking discs.

Another solution consists in acquiring two images of a patient while using different anti-scatter screens, then by using these two acquired images to reconstruct an image which is free of the scattered radiation. However, a solution of this type has the drawback that an additional image is acquired, which increases the patient's exposure time to the X-radiation.

All these solutions therefore involve additional physical means which are more or less complex and expensive.

Another solution consists in estimating the level of the scattered radiation on the basis of the parameters of the acquisition, in particular while taking the dimensions of the object into account. However, a solution of this type does not make it possible for the internal content of the object to be taken into account.

Theoretical methods have therefore been proposed for estimating the scattered radiation on the basis of the acquired image without using additional physical means. According to this theory, the scattered radiation is proportional to an average convolution weighted by a two-dimensional exponential mathematical function (kernel) taken over a moving window. In other words, the scattered radiation is estimated on the basis of a low-pass filter of the image, the ideal impulse response of which should have rotational symmetry, a decreasing exponential shape and a parameterizable full width at half-height.

Nevertheless, implementation of this theory leads to significant complexity of the corresponding algorithm, as well as to long computation times. Furthermore, for each pixel of the image, and in particular for the first pixel, implementation of this wide exponential function entails acquiring all the pixels of the image before the processing can be carried out. The result of this is that the processing has a latency time which may be as long as 30 ms. However, the time between the acquisition of two successive images is generally of the order of 33 ms. Further to the latency caused by the processing, the other phases of the processing, namely the acquisition and display in particular, themselves lead to latency times of non-negligible length, for example 25 ms for the acquisition. In consequence, further to the problems of algorithm complexity and computation time, implementation of a low-pass filter of this type may lead to total latency times of 100 ms, and this may prove problematic for examining the images, in particular when a catheter present in the patient's body moves.

The invention aims to provide a solution to these problems.

One object of the invention is to estimate the scattered radiation on the basis of the acquired image without using additional physical means, and to propose a very simple way of implementing the estimate of the scattered radiation on the basis of an average convolution weighted by a rotationally symmetric decreasing exponential function, taken over a moving window.

According to the invention, this implementation method greatly reduces the computation time and the algorithm involved, and minimizes the latency time of the processing, making it compatible with a typical acquisition rate of radiological images.

The invention therefore proposes a method for processing a sequence of radiological images or an object, comprising a step of estimating, for each current image, the radiation scattered by the object, and an image correction step in which an estimated scattered radiation is at least partially eliminated from the current image.

According to a general characteristic of the invention, in the image correction step, the scattered radiation estimated and at least partially eliminated from the current image is the scattered radiation estimated for the previous image. In combination with this characteristic, the estimation step provides the definition of a first row scan direction for the pixels (for example from left to right) and a second row scan direction, which is the opposite of the first, (for example from right to left), for each row of the current image, and a first column scan direction for the pixels (for example top-down) and a second column scan direction, which is the opposite of the first, (for example bottom-up), for each column of the current image. A recursive law is furthermore defined which, for a pixel in question, develops a so-called calculated intensity, this calculated intensity being obtained by modulating the calculated intensity of the previous pixel, while taking into account the scan direction in question, with a coefficient of less than 1, and by adding to this modulated intensity a so-called initial intensity of the said pixel in question, modulated with the complement to one of the said coefficient.

Advantageously, during the first application of the said recursive law using one of the scan directions, for example in the left to right direction, for a row, the said initial intensity of the current pixel is the intensity of the pixel in the current acquired image, whereas for the subsequent applications, the initial intensity of the current pixel is that obtained from the previous applications of the said recursive law.

According to the invention, in the estimation step, the said recursive law is applied four times in succession to each current pixel of the current image, while respectively considering the two row scan directions and the two column scan directions. The intensity calculated for the said current pixel after the four applications of the recursive law is then representative of the value of the scattered radiation for this pixel.

This improves the quality of the images while increasing the image processing speed and minimizing the latency time of the processing.

According to a preferred embodiment of the invention, for each current row of the current image, the said law is applied a first time using the first row scan direction (for example from left to right), for all the pixels of the row, then the said law is applied to the said current row for a second time using the second row scan direction, (that is to say in the opposite direction starting from the last pixel of the row), for all the pixels of the row, then, when all the pixels of the said current row have been taken into consideration using the said first and second row scan directions, the said recursive law is applied a third time for each current pixel of the current row by using this current pixel and the pixel which is located in the same column and precedes this current pixel in terms of the first column scan direction. Thus, for example, the current pixel and the pixel located above this current pixel in the same column will be used for this third application, taking a top-down column scan direction. When these three applications of the said law have been performed for all the rows of the current image, the said law is applied a fourth time for all the pixels of each current column of the image using the second column scan direction.

In other words, if the second column scan direction is the bottom-up direction, then all the columns of the image are travelled up.

Figure 2:
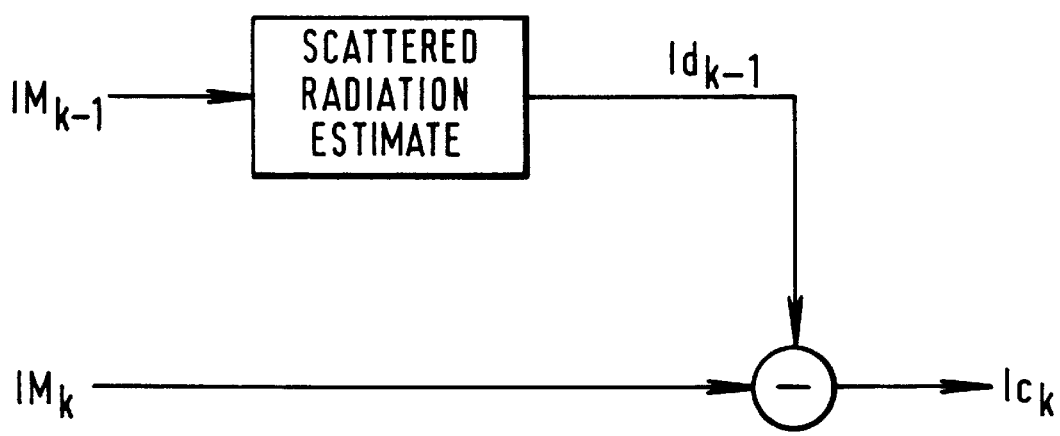

Other advantages and characteristics of the invention will emerge on examining the detailed description of an entirely non-limiting embodiment, and the appended drawings, in which:

FIG. 1 schematically illustrates the estimation of the scattered radiation of a current image, and FIG. 2 schematically illustrates the correction of the acquired image on the basis of the estimated scattered radiation.

In FIG. 1, the reference $IM_k$ denotes a current image of the acquired sequence of radiological images. In conventional fashion, each radiological image is obtained after an object has been illuminated with X-radiation. A conventional X-ray detector including, for example, a video camera, is placed behind the object. The acquired images are then digitized and sent to a processing unit whose architecture is based on a microprocessor in which the various processing operations according to the invention are carried out using software.

Each image $IM_k$ includes a plurality of pixels distributed over rows $L_o$ to $L_r$ and over columns $C_o$ to $C_q$. In practice, an image may include 512 rows and 512 columns.

In general, according to the invention, the decreasing exponential convolution function is implemented recursively by splitting it into four identical exponential functions EX1, EX2, EX3 and EX4 which are applied sequentially. A pixel scan direction is furthermore defined for each of the simple exponential functions EXi. More precisely, the exponential function EX1 will be implemented recursively by scanning all the pixels of a current row $L_i$ using a first row scan direction SD1, here the left to right direction. Similarly, the simple exponential function EX2, which is the homologue of the function EX1, will be implemented recursively for all the pixels of the row $L_i$ while scanning them in a second scan direction SD2 which is the opposite of the first.

As regards the columns, the exponential functions EX3 and EX4 will be implemented recursively by scanning the pixels of each current column $C_j$ in the column scan directions SD3 and SD4, respectively (here top-down and bottom-up).

In general, each exponential function is implemented recursively in the processor by the following formula:

$$b(n+1)=\alpha b(n)+(1-\alpha)a(n+1)$$

in which:

b(n+1) denotes an intensity calculated for a pixel of rank n+1, scanned in a relevant scan direction, b(n) denotes the calculated intensity of the pixel of rank n preceding the pixel of rank n+1 in terms of the scan direction in question, a(n+1) denotes a so-called initial intensity of the pixel of rank n+1, the significance of which will be returned to in more detail below, and $\alpha$ denotes a weighting coefficient of less than 1, typically of the order of 0.9.

Furthermore, the initial condition of this recursive law is b(0)=0.

A particular embodiment of the invention, applying this recursive law four times for each pixel, will now be described in more detail.

It will be assumed in this regard that all the pixels P of the current row $L_i$ are firstly scanned using the first row scan direction SD1, that is to say from left to right starting from pixel $P_{i,0}$ and continuing to pixel $P_{i,q}$.

The recursive law which is applied has been defined by the following formula:

$$y_{i,j+1}=\alpha y_{i,j}+(1-\alpha)x_{i,j+1}$$

in which:

$y_{i,j+1}$ is the calculated intensity of the pixel $P_{i,j+1}$, $y_{i,j}$ is the calculated intensity of the previous pixel $P_{i,j}$, $x_{i,j+1}$ is the initial intensity of the pixel $P_{i,j+1}$, that is to say the effective intensity of this pixel in the acquired current image $IM_k$.

The initial condition of this law is then $y_{i,o}=0$.

When all the pixels of this row have been scanned in the direction SD1, the exponential function EX2 is implemented recursively by scanning the pixels of the row $L_i$ in the direction SD2, that is to say, in this case, right to left starting from pixel $P_{i,k}$, which then becomes the first pixel.

This exponential function EX2 is implemented according to the following recursive law:

$$z_{i,j}=\alpha z_{i,j+1}+(1-\alpha)y_{i,j}$$

in which:

$z_{i,j}$ is the calculated intensity of the pixel $P_{i,j}$, $z_{i,j+1}$ is the calculated intensity of the pixel $P_{i,j+1}$, which is here the previous pixel in terms of the scan direction SD2.

The initial condition is $z_{i,q}=0$.

When all the pixels of the current row $L_i$ have been taken into consideration in the two scan directions SD1 and SD2, the general recursive law is applied a third time for each current pixel $P_{i,j}$ of the current row, by using this current pixel $P_{i,j}$ and the preceding pixel $P_{i-1,j}$ in terms of the top-down scan direction SD3 of the current column $C_j$.

The exponential function EX3 is thus implemented recursively according to the following formula:

$$v_{i+1,j}=\alpha v_{i,j}+(1-\alpha)z_{i+1,j}$$

in which $v_{i+1,j}$ is the calculated intensity of the pixel $P_{i+1,j}$ and $v_{i,j}$ is the calculated intensity of the preceding pixel $P_{i,j}$ in terms of the shift direction SD3.

The initial condition is here $v_{0,j}=0$.

Finally, when the three applications of the recursive law have been performed for all the rows of the current image, the said recursive law is applied a fourth time for all the pixels of each current column $C_j$ of the image, using the second column scan direction SD4.

The exponential function EX4 is then implemented recursively by the following law:

$$w_{i,j} = \alpha w_{i+1,j} + (1-\alpha) v_{i,j}$$

in which:

$w_{i,j}$ denotes the calculated intensity of the pixel $P_{i,j}$, $w_{i+1,j}$ denotes the intensity of the pixel $P_{i+1,j}$, which is the previous pixel in terms of the scan direction SD4, with the initial condition $w_{r,j}=0$.

The value $w_{i,j}$ is thus representative of the intensity of the scattered radiation for the pixel $P_{i,j}$.

The various values of y, z and v are, of course, stored in a memory of the processor during the processing.

The person skilled in the art will note that the invention implements the exponential convolution function on the basis of four independent passes, needing only three operations per pixel per pass.

Furthermore, the only independent pass requiring acquisition of the complete image is the fourth one. The other passes can be carried out without waiting for the full image to be acquired. In consequence, in combination with the particularly short computation time required by implementation of the recursive law according to the invention, the invention makes it possible to obtain a processing time, including latency, of the order of 3 ms when using a 100 MHz microprocessor of the Texas Instrument [sic] C80 series.

In view of the fact that the acquisition time for an image is of the order of 25 ms, this 3 ms processing time is very much compatible with the 8 ms which remain before acquisition of the next image in the sequence.

Furthermore, in combination with this type of processing to estimate the unsharpness of the current image, the invention provides (FIG. 2) for the image $Id_{k-1}$, corresponding to the scattered radiation estimated for the previous image $IM_{k-1}$ in the sequence, to be subtracted from the current acquired image $I_k$ [sic].

In other words, the invention subtracts from the current image the unsharpness estimated for the previous image, instead of subtracting the sharpness estimated for this current image.

The justification for this is that it has been observed that the low-frequency behaviours of two adjacent images in the sequence do not differ substantially from one another. In other words, the unsharpness of one image differs little in practice from the unsharpness of the previous image.

As regards the first image of the sequence of images, no unsharpness will be estimated for this image, and the image correction step will be initiated starting from the second image.

The invention does not therefore introduce any additional latency here and, for each current image $IM_k$ which is acquired, makes it possible to obtain in real-time the corrected image $Ic_k$ which will be displayed.

For the sake of simplicity, FIG. 2 represents a subtractor illustrating the elimination of the unsharpness from an image. Despite this, this elimination may be either complete or partial, so that, if desired, an image background may intentionally be left in place in order to allow the elements of interest in the said image to be shown better in relief. Other mathematical operations, for example division, may also be provided for this elimination step.

What is claimed is:

1. A method for processing a sequence of radiological images of an object, comprising the steps of:

a. estimating, for each current image, the radiation scattered by the object, wherein a first row scan direction (SDI) for the pixels and a second row scan direction (SD2), which is the opposite of the first, is defined for each row ($L_i$) of the current image, and a first column scan direction (SD3) for the pixels and a second column scan direction (SD4), which is the opposite of the first, is defined for each column of the current image, a recursive law is defined which, for a pixel (P) in question, develops a calculated intensity (y, z, v, w) obtained by modulating the calculated intensity of the preceding pixel in terms of the scan direction in question, with a coefficient ($\alpha$) of less than one, and by adding to this modulated intensity an initial intensity (x, y, z, v) of the pixel in question, modulated with the complement to one, of the coefficient ($1-\alpha$), and the recursive law is applied four times in succession to each current pixel of the current image, while respectively considering the two row scan directions and the two column scan directions, the intensity (w) calculated for the current pixel after the four applications of the recursive law being representative of the value of the scattered radiation for this pixel, and b. an image correction step in which an estimated scattered radiation is at least partially eliminated from the current image, wherein the scattered radiation estimated and at least partially eliminated from the current image ($IM_k$) is the scattered radiation ($Id_{k-1}$) estimated for the preceding image ($IM_{k-1}$), so as to improve the quality of the images while increasing the image processing speed and minimizing the latency time of the processing.

2. The method according to claim 1, wherein during the first application of the recursive law using one of the scan directions, the initial intensity (x) of the current pixel (P) is the intensity of the pixel in the current image, whereas for the subsequent applications, the initial intensity of the current pixel is that obtained from the previous applications of the recursive law.

3. The method according to claim 2 wherein for each current row ($L_i$) of the current image, the law is applied a first time using the first row scan direction (SDI), for all the pixels of the row, then the law is applied to the current row ($L_i$) for a second time using the second row scan direction (SDI), for all the pixels of the row, then, when all the pixels of the current row have been taken into consideration using the first and second row scan directions, the law is applied a third time for each current pixel of the row by using this current pixel and the pixel which is located in the same column ($C_j$) and precedes this current pixel in terms of the first column scan direction (SD3), and, when these three applications of the law have been performed for all the rows of the current image, the law is applied a fourth time for all the pixels of each current column ($C_j$) of the image using the second column scan direction (SD4).

4. The method according to claim 1 wherein for each current row ($L_i$) of the current image, the law is applied a first time using the first row scan direction (SDI), for all the pixels of the row, then the law is applied to the current row ($L_i$) for a second time using the second row scan direction (SDI), for all the pixels of the row, then, when all the pixels of the current row have been taken into consideration using the first and second row scan directions, the law is applied a third time for each current pixel of the row by using this current pixel and the pixel which is located in the same column ($C_j$) and precedes this current pixel in terms of the first column scan direction (SD3), and, when these three applications of the law have been performed for all the rows of the current image, the law is applied a fourth time for all the pixels of each current column ($C_j$) of the image using the second column scan direction (SD4).

5. Method according to claim 4, characterized in that, during the first application of the said recursive law using one of the scan directions, the said initial intensity (x) of the current pixel (P) is the intensity of the pixel in the current image, whereas for the subsequent applications, the initial intensity of the current pixel is that obtained from the previous applications of the said recursive law.

* * * * *